US008837415B1

(12) United States Patent
Oroskar et al.

(10) Patent No.: US 8,837,415 B1
(45) Date of Patent: Sep. 16, 2014

(54) ASSIGNMENT OF AIR-INTERFACE SPREADING CODES IN A CELLULAR WIRELESS COMMUNICATION SYSTEM

(75) Inventors: Siddharth S. Oroskar, Overland Park, KS (US); Sachin R. Vargantwar, Macon, GA (US); Anoop K. Goyal, Overland Park, KS (US); Sandeep Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 139 days.

(21) Appl. No.: 13/586,453

(22) Filed: Aug. 15, 2012

(51) Int. Cl.
*H04W 4/00* (2009.01)

(52) U.S. Cl.
USPC .......................................................... 370/329

(58) Field of Classification Search
CPC ................ H04L 5/00; H04W 72/044–72/0493
See application file for complete search history.

(56) References Cited

U.S. PATENT DOCUMENTS

| 6,504,832 | B1 * | 1/2003 | Koo et al. ...................... 370/342 |
| RE40,518 | E | 9/2008 | Lee et al. |
| 7,551,582 | B2 | 6/2009 | Mansour |
| 2006/0264220 | A1 * | 11/2006 | Chen et al. ..................... 455/454 |
| 2009/0110032 | A1 * | 4/2009 | Yuan ............................. 375/130 |

OTHER PUBLICATIONS

Sung Soo Cho, et al., "Capacity Analysis of Downlink CDMA Systems with Quasi-Orthogonal Sequences," IEEE GLOBECOM 2006 proceedings, 2006.
Kyeongcheol Yang, et al., "Quasi-Orthogonal Sequences for Code-Division Multiple-Access Systems," IEEE Transactions of Information Theory, vol. 46, No. 3, May 2000.
Abhijit Shanbhag and Jack Holtzman, "Optimal QPSK Modulated Quasi-Orthogonal Functions for IS-2000," IEEE 6th Int. Symp. on Spread Spectrum Tech & Appli., Sep. 6-8, 2000.
Levent Aydin and Walid Hamdy, "On the Use of QOF Functions with RC3 in Walsh Code Limited Base Station Deployments," The 57th IEEE Semiannual, Vehicular Technology Conference, vol. 4, pp. 2192-2195, Apr. 2003.
Cesaltina Ricardo, et al., "Wireless Systems—New quasi-orthogonal BCH-derived sequences for CDMA applications," European Transactions on Telecommunications, 18:803-810, 2007.
Agilent Technologies, "Designing and Testing cdma2000 Base Stations—Application Note 1357," 2003.

* cited by examiner

*Primary Examiner* — Chi Pham
*Assistant Examiner* — Fahmida Chowdhury

(57) ABSTRACT

A method, system, and apparatus for managing spreading codes used in communication over a radio frequency air interface. When a radio access network (RAN) is to assign a spreading code to a mobile station in the coverage area, the RAN may determine which mobile station currently having an assigned traffic channel in the coverage area has a highest forward-link signal quality, and the RAN may select a spreading code based on the spreading code of that determined mobile station's assigned traffic channel. For instance, the RAN may select a spreading code that is quasi-orthogonal to the spreading code of the determined mobile station's assigned traffic channel.

18 Claims, 3 Drawing Sheets

ASSIGNMENT OF AIR-INTERFACE SPREADING CODES IN A CELLULAR WIRELESS COMMUNICATION SYSTEM

BACKGROUND

A typical cellular wireless system includes a number of base stations that radiate to define wireless coverage areas, such as cells and cell sectors, in which mobile stations (such as cell phones, tablet computers, tracking devices, embedded wireless modules, and other wirelessly equipped communication devices) can operate. In turn, each base station is typically coupled with equipment that provides connectivity with one or more transport networks, such as the public switched telephone network (PSTN) and/or the Internet for instance. With this arrangement, a mobile station operating within a coverage area of any base station can engage in air interface communication with the base station and can thereby communicate via the base station with various remote network entities or with other mobile stations served by the base station.

In practice, communications over the air interface between a base station and a mobile station are structured in accordance with a particular air interface protocol or "radio access technology," with communications from the base stations to mobile stations defining a "forward link" (or downlink) and communications from the mobile stations to the base station defining a "reverse link" (or uplink). Numerous such protocols are well known in the art, and others will be developed in the future. Examples of existing protocols include CDMA (e.g., 1xRTT, 1xEV-DO), LTE, WiMAX, iDEN, TDMA, AMPS, GSM, GPRS, UMTS, EDGE, microwave, satellite, MMDS, Wi-Fi (e.g., IEEE 802.11), and Bluetooth. Each protocol may define its own procedures for initiation of calls, handoff between coverage areas, and functions related to air interface communication.

Further, each base station in a cellular wireless system has various air interface resources that the base station can allocate for use to serve mobile stations operating in its coverage area(s). For example, in each coverage area, the base station may have a limited amount of transmission power (e.g., a maximum power level of the base station's power amplifier), and the base station may need to allocate that power among concurrent communications with mobile stations. As another example, in each coverage area, the base station may have a limited frequency spectrum, and the base station may need to allocate portions of that spectrum among concurrent communications with mobile stations. And as still another example, in each coverage area, the base station may have a limited supply of spreading codes to use for encoding air interface communications, and the base station may need to allocate those codes among concurrent communications as well.

As a specific example, each coverage area in a spread spectrum system uses spreading codes to uniquely define communication channels on the air interface, and in order to preserve distinctions (orthogonality) between the codes, a limited number of such codes exists. Each sector or other coverage area of a CDMA spread spectrum system, for instance, has a limited set of "Walsh codes" that are used, along with other spreading codes, to define various air interface channels. For example, each coverage area may have just 64 Walsh codes, 128 Walsh codes, or just 256 Walsh codes. Typically, a small number of those Walsh codes are reserved for use to encode overhead control channels, while the remainder of the Walsh codes are assigned on an as-needed basis to encode bearer traffic channels for voice or data calls.

Walsh codes provide orthogonality between channels on the air interface because the cross-correlation between Walsh codes is zero when aligned. Consequently, in the absence of multipath interference or other factors, a mobile station can completely separate a forward-link channel that is encoded with a particular Walsh code from another forward-link channel that is encoded with another Walsh code, thus theoretically eliminating interference between the channels.

Given the growing demand for cellular wireless service and the limited number of Walsh codes available in each coverage area of a CDMA system, such a system may be arranged to implement one or more additional sets of spreading codes known as "quasi-orthogonal functions" (QOFs). Each set of QOFs is generated from the underlying set of Walsh codes by multiplying each base Walsh code by a QOF mask. In general, all of the QOFs thus generated by applying a given QOF mask are fully orthogonal to each other. However, any QOF generated by applying a given QOF mask is not fully orthogonal to any other QOF generated by applying a different QOF mask but is rather just partially orthogonal or quasi-orthogonal to any such other QOF. For this reason, air-interference channels encoded using QOFs that were generated by applying different QOF masks are more likely to interfere with each other.

OVERVIEW

When a cellular wireless system sets up a call for a mobile station in a given coverage area (or when a call is being handed off into the coverage area), the system may need to assign a spreading code for use to encode traffic channel communication with the mobile station. Considering the discussion above, if the system is using QOFs in that scenario, it would be best for the system to assign a QOF that is generated from the same QOF mask as other QOFs currently assigned in the coverage area. That way, mobile stations in the coverage area would theoretically be able to separate their traffic channel communication from communications on other air interface channels.

Unfortunately, however, because of the limited number of Walsh codes available in each coverage area, there will by definition be a limited number of QOFs generated by applying a given QOF mask In a scenario where the system has already assigned all QOFs generated by applying a given QOF mask, the system may therefore need to assign a QOF generated by applying a different QOF mask. As noted above, however, such a QOF would be just quasi-orthogonal with QOFs already assigned in the coverage area, thus creating an increased risk of interference.

Disclosed herein is a mechanism (e.g., method, system, and/or apparatus) to help address this issue, by intelligently selecting and assigning a QOF that may be least likely to create interference problems.

In one respect, for instance, disclosed is a method for managing spreading-code assignment. In particular, the method may involve a radio access network (RAN) receiving from a particular mobile station in a cellular coverage area of the RAN a request for the RAN to assign to the particular mobile station an air interface traffic channel in the cellular coverage area. Further, the method may involve the RAN determining which one of a plurality of mobile stations each currently having an assigned air interface traffic channel in the cellular coverage area has a highest forward-link signal quality, and the RAN determining a spreading code of the air interface traffic channel that is assigned to the determined mobile station. The method may then involve the RAN selecting a particular spreading code based at least in part on the determined spreading code of the air interface traffic channel assigned to the mobile station determined to have the highest forward-link signal quality. And the method may then involve, responsive to the request, the RAN assigning to the particular mobile station an air interface traffic channel that uses the selected spreading code.

In another respect, disclosed is a system for managing spreading-code assignment. Such a system may take the form of a RAN having an antenna structure and a controller. The antenna structure may be arranged to define an air interface coverage area, to receive from a particular mobile station in the air-interface coverage area a spreading code assignment request, and to transmit to the particular mobile station an assignment message assigning the particular mobile station to use a particular spreading code for air interface communication in the coverage area. The controller may then be arranged to select, based at least in part on evaluation of forward-link signal quality by one or more other mobile stations in the coverage area, the particular spreading code for the particular mobile station to use for air interface communication in the coverage area, and to cause the assignment message to direct the particular mobile station to use the selected particular spreading code for air interface communication in the coverage area.

Further, in still another respect, disclosed is an apparatus for managing spreading-code assignment. Such an apparatus may take the form of a non-transitory computer readable medium having encoded thereon instructions executable by a processing unit to carry out particular functions. The functions may include receiving from a particular mobile station in a cellular coverage area of a RAN a request to assign to the particular mobile station an air interface traffic channel in the cellular coverage area. Further, the functions may include determining which one of a plurality of mobile stations each currently having an assigned air interface traffic channel in the cellular coverage area has a highest forward-link signal quality, and determining a spreading code of the air interface traffic channel assigned to the determined mobile station. Yet further, the functions may include selecting a particular spreading code based at least in part on the determined spreading code of the air interface traffic channel assigned to the mobile station determined to have the highest forward-link signal quality. And the functions may include, responsive to the request, assigning to the particular mobile station an air interface traffic channel that uses the selected spreading code, to cause the particular mobile station to engage in air interface traffic channel communication using the selected spreading code.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
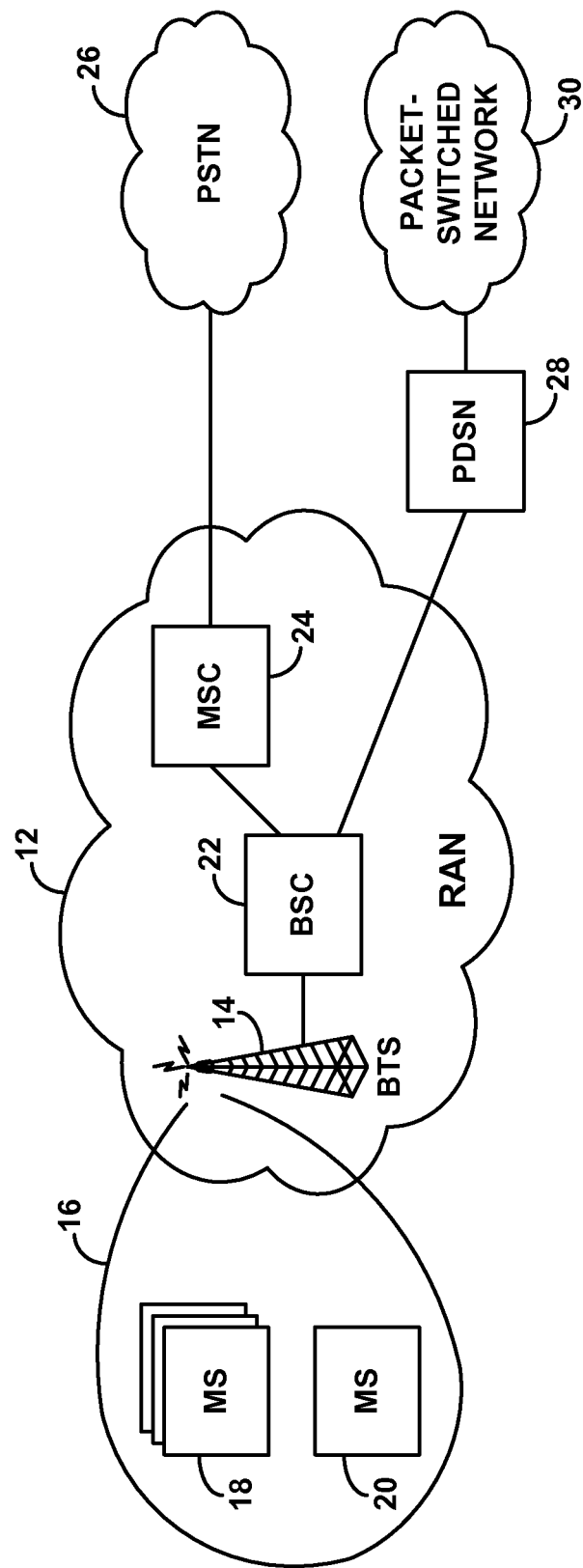
FIG. 1 is a simplified block diagram of a network in which the method can be implemented.

For illustration, the present method will be described with respect to CDMA communications and particularly with respect to selecting a QOF to assign to a mobile station in a CDMA coverage area. It should be understood, however, that part or all of the method may apply equally to other air interface protocols that make use of spreading codes, not limited to QOFs as presently understood.

Referring to the drawings, as noted above, FIG. 1 is a simplified block diagram of an example communication system in which the present method can be implemented. It should be understood, however, that this and other arrangements described herein are provided as example only, and other arrangements and other elements (e.g., machines, interfaces, functions, orders of functions, etc.) can be used instead and some elements may be omitted altogether. Further, those skilled in the art will appreciate that many of the elements described herein are functional entities that may be implemented as discrete components or in conjunction with other components, in any suitable combination and location, and may be implemented at least in part by one or more computer processors executing program instructions stored in a non-transitory computer readable medium.

As shown in FIG. 1, the example system includes at its core a RAN 12 having a representative base transceiver station (BTS) 14 that radiates to define a representative air interface coverage area 16 (e.g., cell sector). Shown operating within the coverage area 16 are then several representative mobile stations 18 having assigned air interface traffic channels as well as another mobile station 20 to which the RAN may assign an air interface traffic channel in accordance with the present method.

BTS 14 is shown coupled with a base station controller (BSC) 22, which may function to control various BTS operations as well as aspects of air interface operation such as handoff of calls between coverage areas. BSC 22 is then shown coupled with a mobile switching center (MSC) 24, which provides connectivity with the PSTN 26, and BSC 22 is further shown coupled with a packet data serving node (PDSN) 28, which provides connectivity with a packet-switched network 30 such as the Internet for instance. With this arrangement, as discussed above, mobile stations 18, 20 may engage in air interface communication with BTS 14 and ay thereby communicate via the BTS with various network entities on the PSTN or packet-switched network or with other mobile stations served by the BTS.

In practice, the functions described herein may be implemented at the BTS, at the BSC, and/or at any other component of the system. Each such component, as well as other network components in the system, will preferably include a processing unit (e.g., one or more general purpose processors and/or dedicated processors), data storage (e.g., one or more volatile and/or non-volatile storage components) containing program logic executable by the processor to carry out functions described herein, and a network connection mechanism to facilitate communication with other components of the system. Alternatively, the method could be implemented at least in part by other entities and/or by other types of logic (such as hardware logic for instance). Other implementation mechanisms are possible as well.

Optimally, some or all aspects of the method will be implemented at the time a call is being admitted into coverage area 16, such as when the call is being initiated in the coverage area or when the call is being handed off into the coverage area. For instance, the method may be implemented with respect to a call that is being initiated to or from mobile station 20 in coverage area 16. Alternatively, the method may be implemented at some other time with respect to a call in a given sector, such as if a change of resource-allocation type is being made during an existing call.

The call at issue can be a voice call (e.g., a call placed over PSTN 26), a data call (e.g., a wireless packet data session (e.g., for HTTP, SIP, VoIP, media streaming, etc. placed over packet-switched network 30), often referred to as a "call"), or some other type of call that will use air interface traffic channel resources in the coverage area. The manner in which the call is initiated in the sector can vary depending on the type of call (e.g., voice or data), the version of air interface protocol being used, and/or other factors.

By way of example, under CDMA2000, mobile station 20 may originate a call (voice or data) by transmitting an origination message on an air interface access channel to BTS 14, providing in the origination message a service option code that designates whether the call is a voice call or a data call. Upon receipt of the origination message, BTS 14 may then signal to BSC 22, and BSC 22 may in turn signal to MSC 24. At the instruction of MSC 24, BSC 22 and/or BTS 14 may then select and assign a spreading code to be used for traffic channel communication in the call, and BTS 14 may transmit an enhanced channel assignment message (ECAM) on an air interface paging channel to mobile station, directing the mobile station to use the selected spreading code to use for the call.

If the call is a legacy voice call, MSC 24 may further work to set up the call via PSTN 26 to the called party. On the other hand, if the call is a data call, BSC 22 may signal to PDSN 28, to trigger establishment of a data link layer connection between PDSN 28 and mobile station 26, and assignment of a mobile-IP address to allow mobile station 20 to communicate on packet-switched network 30.

Likewise, if MSC 24 receives a signaling message requesting establishment of a voice call to mobile station 20, MSC 24 may instruct BSC 22 to page mobile station 20, BSC 22 and/or BTS 14 may select and assign spreading code to be used for traffic channel communication in the call, and BTS 14 may transmit to the mobile station a page message that directs the mobile station to use the selected spreading code. Similarly, if BSC 22 receives packet data destined to mobile station 20 at a time when mobile station 20 does not have an air interface traffic channel (e.g., when mobile station 20 is in a dormant state), BSC 22 and BTS 14 may select and assign a spreading code to be used for traffic channel communication, and BTS 14 may transmit to the mobile station a page message that directs the mobile station to use the selected spreading code.

In general, BTS 14 may have a limited extent of transmission power that the BTS may need to share among various forward-link air interface channels, each using a respective spreading code. Further, the forward-link transmission power requirements for communication with various mobile stations in coverage area 16 may vary depending on factors such as how far the mobile stations are from the base station. To facilitate fair sharing of power among various forward-link channels while helping to ensure that the forward-link transmission power is only as high as it needs to be on a per mobile station basis, the BTS may engage in an ongoing power control process with the mobile stations.

In a typical power control process, each mobile station may regularly evaluate the quality of received radio frames and report frame-quality statistics to the RAN, and the RAN may use those statistics as a basis to adjust the forward-link transmission power allocated to that mobile station. In particular, BTS may incrementally increase the allocated transmission power if the reported frame-quality is threshold low, and the BTS may incrementally decrease the allocated transmission power if the reported frame-quality is threshold high. Alternatively, each mobile station may regularly evaluate forward-link quality such as received transmission power or signal to noise ratio and accordingly transmit power control commands (bits) to the BTS, such as sending a power-up command to the BTS each time the evaluated forward-link quality is too low and sending a power-down command to the BTS each time the evaluated forward-link quality is too high.

Furthermore, to help ensure that that the forward-link transmission power allocated to any given mobile station it not unfairly high or unfairly low, the BTS may also impose for each mobile station a maximum forward-link transmission power and a minimum forward-link transmission power. Thus, if a mobile station is in very good quality air interface conditions, such as very close the BTS, the mobile station may repeatedly request the BTS to reduce forward-link transmission power, and the BTS may ultimately reach the minimum allowable forward-link transmission power and stop reducing it any further. Likewise, if a mobile station is in very poor air interface conditions, such as very far from the BTS, the mobile station may repeatedly request the BTSD to increase forward-link transmission power, and the BTS may ultimately reach the maximum allowable forward-link transmission power and stop increasing it further.

In addition to engaging in this ongoing power control process, each mobile station that has an assigned traffic channel in coverage area 16 may also regularly evaluate a pilot signal broadcast by the BTS in coverage area 16 as well as pilot signals broadcast in other coverage areas (not shown) in an effort to determine when handoff would be appropriate. For instance, for each such coverage area, the mobile station may measure the energy level per chip ($E_c$) of a forward-link pilot signal broadcast in the coverage area as well as the spectral energy known as co-channel interference ($I_o$) in the coverage area, and the mobile station may compute a ratio of $E_c/I_o$ as a measure of forward-link signal level in the coverage area. Alternatively, for each such coverage area, the mobile station may measure a signal to noise ratio such as carrier signal to interference, C/I, as a measure of forward-link signal level in the coverage area. Periodically or on some other basis, the mobile station may then transmit to the BTS a pilot strength management message (PSMM) or the like that indicates the established measure, and the BTS and/or BSC may use that information as a basis to determine whether to direct the mobile station to hand off to another coverage area.

As noted above, the present disclosure provides for managing allocation of spreading codes, such as QOFs. In practice, this may become an issue when RAN 12 begins to exhaust its base supply of Walsh codes for coverage area 16, or in a scenario such as at a particular time of day when the RAN typically experiences high levels of usage and may need a larger supply of spreading codes to serve mobile stations in the coverage area. Regardless of the reason, in an example scenario, the assumption is that the RAN is operating in a mode in which the RAN is using QOFs as forward-link spreading codes in coverage area 16.

Furthermore, considering the fact that QOFs generated by applying the same QOF mask will be fully orthogonal to each other but QOFs generated by applying different QOF masks will be only quasi-orthogonal to each other, the example scenario assumes that the RAN is operating in a mode in which the RAN has at least two different sets of QOFs, each set being generated by applying a different QOF mask to the base set of Walsh codes in the coverage area. Thus, certain QOFs in the coverage area will be quasi-orthogonal to other QOFs in the coverage area and thus more interference prone.

As a simple example of this, assume that the coverage area has six Walsh codes, 1-6, and assume that the four QOF masks, A, B, C, and D, are applied to those Walsh codes, to thereby generate the twenty four QOFs shown in Table 1.

TABLE 1

| WC | QOF-A | QOF-B | QOF-C | QOF-D |
|----|-------|-------|-------|-------|
| 1  | 1A    | 1B    | 1C    | 1D    |
| 2  | 2A    | 2B    | 2C    | 2D    |
| 3  | 3A    | 3B    | 3C    | 3D    |
| 4  | 4A    | 4B    | 4C    | 4D    |
| 5  | 5A    | 5B    | 5C    | 5D    |
| 6  | 6A    | 6B    | 6C    | 6D    |

With this arrangement, as discussed above, QOFs 1A-6A would be fully orthogonal to each other but only quasi-orthogonal to each other QOF shown in the table. Likewise, QOFs 1B-6B would be fully orthogonal to each other but only quasi-orthogonal to each other QOF shown in the table, and so forth.

Note that the QOF masks applied to the base Walsh codes could themselves take various forms. Further, it is possible that the value of one of the QOF masks could be one (, so that when each base Walsh code is multiplied by the QOF mask, the result would be the base Walsh code itself. Considering this, it is possible that one set of QOFs in the coverage area could be the base Walsh codes themselves, while each other sets of QOFs in the coverage area would be generated by applying a different QOF mask and would differ from the set of base Walsh codes. Likewise, the base Walsh codes themselves could be considered QOFs, even if not processed through application of a QOF mask.

The present disclosure is particularly useful in a scenario where the RAN has exhausted all fully orthogonal QOFs in the coverage area and now faces a need to admit a call to the coverage area and thus to assign a QOF that will be quasi-orthogonal to at least one other QOF already assigned to a mobile station in the coverage area. With the arrangement of Table 1, for instance, this may occur if there are currently six mobile stations 18 in the coverage area and the RAN intelligently allocated QOFs from the same set to those six mobile stations so that the currently assigned QOFs are all fully orthogonal to each other. As a specific example, assume that the RAN allocated to the six active mobile stations the QOFs generated by applying mask A, namely, QOFs 1A-6A. At issue for the RAN is then which QOF to allocate to mobile station 20 for the call being newly admitted to the coverage area, considering that any other QOF would be quasi-orthogonal to the currently allocated QOFs.

To resolve this issue, as presently contemplated, the RAN may determine which of the mobile stations 18 currently having an assigned traffic channel in the coverage area has the highest forward-link signal quality, and the RAN may then assign to mobile station 20 a QOF that is quasi-orthogonal to the QOF assigned to that determined mobile station. The theory here is that BTS forward-link transmission power to the mobile station 18 having the highest forward-link signal quality may likely be the lowest, and that mobile station may likely be receiving the strongest forward-link signal strength and/or have the highest forward-link signal-to-noise ratio. The likely low forward-link transmission power to the determined mobile station 18 may mean that forward-link transmissions to that mobile station 18 may be least likely to interfere with forward link transmissions to mobile station 20. Further, the likely strong receive signal strength and/or highest signal-to-noise ratio of the determined mobile station 18 may mean that forward-link transmissions to mobile station 20 may be least likely to interfere with forward-link transmissions to mobile station 18.

To implement this in practice, RAN 12 may maintain a record of forward-link signal quality respectively for each mobile station 18 currently having an assigned traffic channel in the coverage area 16. Such a record could indicate various aspects of forward-link signal quality and could take various forms.

By way of example, the forward-link signal quality of a mobile station in coverage area 16 could be indicated by the mobile station's report of pilot strength of coverage area 16. As indicated above, for instance, a mobile station may from time to time transmit to BTS 14 a PSMM or the like that may indicate pilot strength, such as $E_c/I_o$ or C/I. The BTS 14 or BSC 22 may keep track of such reports from the mobile station, possibly just the last such report from the mobile station, storing the reported pilot strength measurement in data storage for later reference. To determine which mobile station 18 currently having an assigned traffic channel in the coverage area has the highest forward-link signal quality, the RAN may then refer to that stored data to determine which one of the mobile stations 18 has the highest reported pilot strength for the coverage area.

As another example, possibly in addition or as an alternative, the forward-link signal quality of a mobile station in coverage area 16 could be indicated by the forward-link transmission power that the BTS 14 is currently using for transmission to the mobile station. As the BTS and/or BSC would normally keep track of this transmission power level in order to transmit at the power level, the RAN may thus readily determine as the mobile station that has the highest forward-link signal quality the mobile station that has the lowest forward-link transmission power. As a specific example of this, the RAN may determine as the mobile station that has the highest forward-link signal quality the mobile station to which the BTS is currently set to transmit at the minimum forward-link transmit power as discussed above.

And as still another example, possibly in addition or as an alternative, the forward-link signal quality of a mobile station in coverage area 16 could be indicated by the frame quality or power control commands that the mobile station has transmitted to the BTS to facilitate forward-link power control. For instance, if the mobile station has recently transmitted many frame-quality statistics indicating high frame quality (e.g., a continuous sequence of a threshold number of reports of high frame quality) or many power-down commands (e.g., a continuous sequence of a threshold number of power-down commands), a reasonable conclusion may be that the mobile station is experiencing high forward-link quality. The RAN may thus keep track of these reports from each mobile station and may determine the mobile station having the highest forward-link signal quality by determining which mobile station has transmitted the most such high frame quality or power down commands.

Furthermore, as a variation of the above possibilities, the RAN could additionally consider the forward-link signal quality of the mobile station 20 for which the call is being admitted to the coverage area. For instance, such a mobile station 20 may report its forward-link signal quality (e.g., Ec/Io, C/I, or the like) to the RAN together with its request for a traffic channel. The RAN could then determine which mobile station 18 currently having an assigned traffic channel in the coverage area has the highest forward-link signal quality in relation to that of mobile station 20, such as which mobile station 18 has the highest reported forward-link signal quality that is higher than that reported by mobile station 20.

There may be situations where the RAN determines that two or more of the mobile stations 18 currently having assigned traffic channels in the coverage area both have the highest forward-link signal quality. In that scenario, the RAN may choose one of the two or more to be considered the one determined mobile station. For instance, the RAN may choose one of the two of more mobile stations randomly, based on service level agreement, or on any other basis.

Once the RAN determines which of the mobile stations currently having an assigned traffic channel in the coverage area has the highest forward-link signal quality, the RAN may determine the QOF currently assigned to that mobile station. And the RAN may then select a QOF based on that determined QOF, such as by selecting a QOF that is quasi-orthogonal to that determined QOF.

Continuing with the example discussed above, for instance, the RAN might determine levels of forward-link signal quality as shown in Table 2.

TABLE 2

| MS | ASSIGNED QOF | FORWARD-LINK SIGNAL QUALITY |
| --- | --- | --- |
| MS1 | 1A | Medium |
| MS2 | 2A | Poor |
| MS3 | 3A | Medium |
| MS4 | 4A | Excellent |
| MS5 | 5A | Medium |
| MS6 | 6A | Medium |

In this scenario, the RAN may thus determine that MS4 has the highest forward-link signal quality and that QOF 4A is assigned to MS4. Given that, the RAN may then specifically select a QOF that is quasi-orthogonal to QOF 4A, such as one from the same set of QOFs generated by applying QOF mask A. For instance, the RAN my select QOF 4B. The RAN may then assign that selected QOF 4B to mobile station 20. For instance, the BTS may transmit an ECAM to mobile station 20, directing mobile station 20 to use spreading code 4B for forward-link communications in the coverage area.

Note also that spreading codes such as Walsh codes can take various forms depending on radio configuration. For instance, under radio-configuration-3 (RC3), Walsh codes are 64-bits each, whereas under radio-configuration-4 (RC4), Walsh codes are 128-bits each. Shorter Walsh codes consume less power and may therefore be more desirable given limited resources. Further, the base set of Walsh codes may be a combination of RC3 codes and RC4 codes, i.e., some of each, and so each set of QOFs may thus be that combination of RC3 QOFs and RC4 QOFs. Considering the power savings from use of RC3 codes, the RAN may additionally be arranged to prefer RC3 QOFs over RC4 QOFs. For instance, if faced with a choice between assigning QOF 4B and QOF 4C in the example above, and if QOF 4B is an RC4 QOF but QOF 4C is an RC3 QOF, the RAN may specifically choose QOF 4C to help conserve power.

Figure 2:
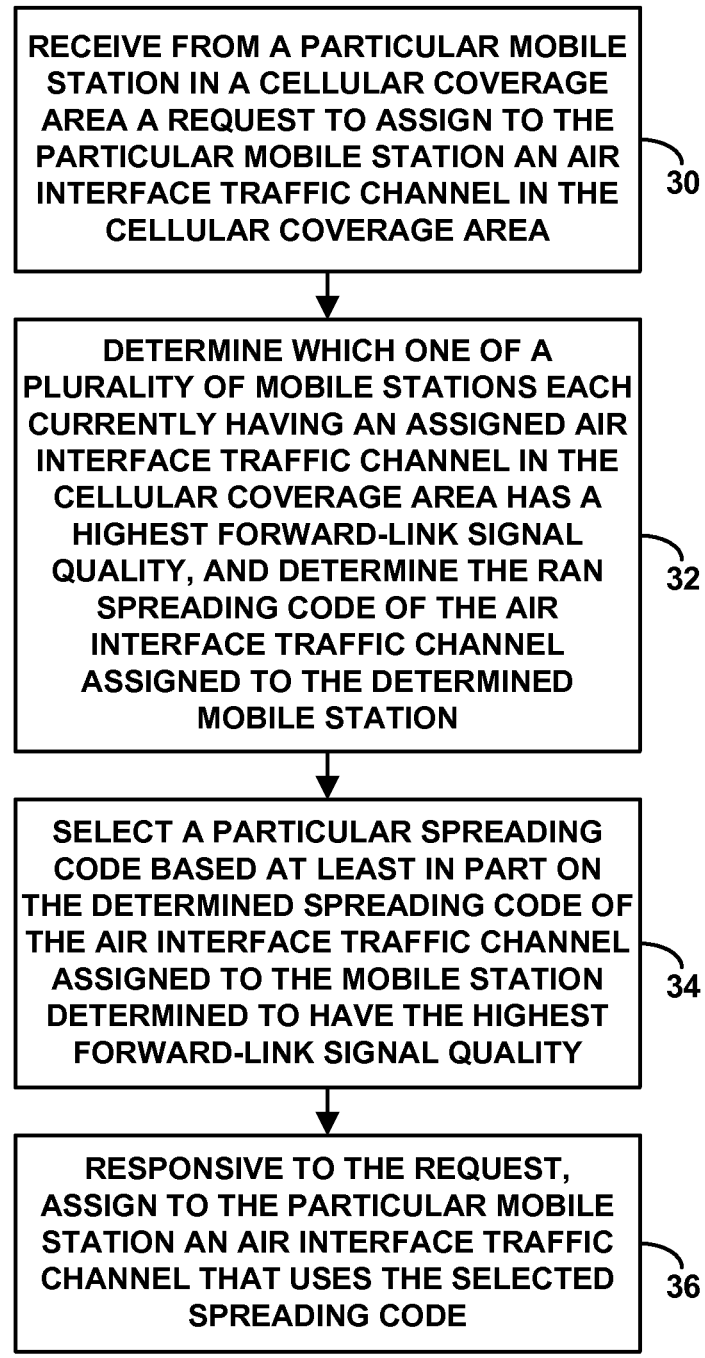
FIG. 2 is a flow chart depicting a set of functions that can be carried out in accordance with the method.

FIG. 2 is next a flow chart depicting in summary various functions that can be carried out in this process. As noted above, these functions may be carried out by a RAN and particularly by one or more RAN entities such as a BTS, BSC, and/or MSC for instance.

As shown in FIG. 2, at block 30, the process may involve the RAN receiving from a particular mobile station in a cellular coverage area of the RAN a request for the RAN to assign to the particular mobile station an air interface traffic channel in the cellular coverage area. Further, at block 32, the process may involve the RAN determining which one of a plurality of mobile stations each currently having an assigned air interface traffic channel in the cellular coverage area has a highest forward-link signal quality, and the RAN determining a spreading code of the air interface traffic channel assigned to the determined mobile station. At block 34, the method may then further involve the RAN selecting a particular spreading code based at least in part on the determined spreading code of the air interface traffic channel assigned to the mobile station determined to have the highest forward-link signal quality. And at block 36, the process may involve, responsive to the request, the RAN assigning to the particular mobile station an air interface traffic channel that uses the selected spreading code.

In practice, the RAN may further determine for the coverage area, in response to receiving the request, that there is no available spreading code that is fully orthogonal to each other spreading code currently assigned in the coverage area. The RAN may then carry out some or all of the functions shown in FIG. 2 in response to this determination.

Further, in line with the discussion above, the act of selecting the particular spreading code based at least in part on the determined spreading code may involve identifying, based at least in part on the determined spreading code, a group of spreading codes that are each quasi-orthogonal to the determined spreading code—such as identifying each other spreading code generated by a QOF mask different than that used to generate the determined spreading code—and selecting the particular spreading code from that identified group.

Figure 3:
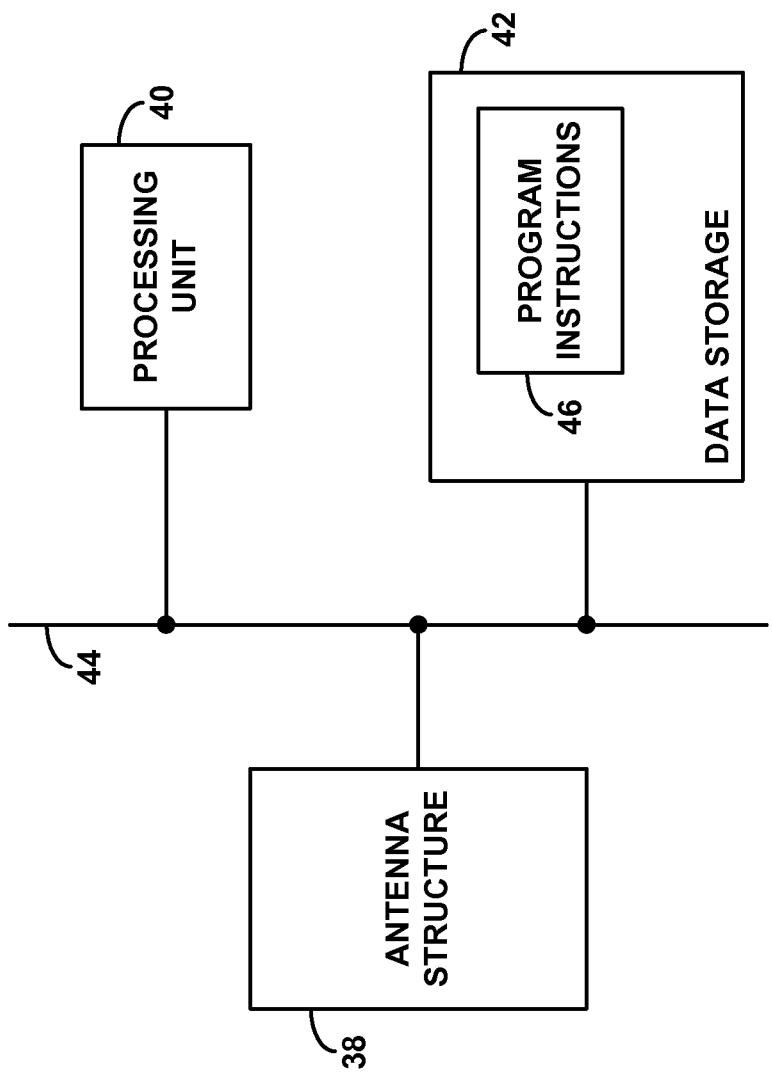
FIG. 3 is simplified block diagram depicting components of a RAN that may implement the method.

FIG. 3 is next a simplified block diagram depicting components of an example RAN arranged to implement this process. As shown, the example RAN includes an antenna structure 38, a processing unit 40, and data storage 42, all of which may be coupled together by a network or other connection mechanism 44. This arrangement may represent a macro network RAN, a femtocell, or other configuration.

Antenna structure 38 may comprise one or more antennas configured to radiate so as to define an air-interface coverage area, as well as a variable power amplifier to facilitate power adjustments as discussed above. In operation, the antenna structure would receive from a particular mobile station in the air-interface coverage area a spreading code assignment request, such as an origination request to which the RAN would respond by assigning a traffic channel using a particular spreading code. Further, the antenna structure would transmit to the particular mobile station an assignment message assigning the particular mobile station to use a particular spreading code for air interface communication in the coverage area.

Processing unit 40 and data storage 42 may then cooperatively define a controller (though the controller could take other forms) that functions to select the spreading code to assign to the particular mobile station. As such, the processing unit 40 may comprise one or more general purpose processors (e.g., microprocessors) and/or one or more special purpose processors, and the data storage may comprise one or more volatile and/or non-volatile storage components (non-transitory), such as magnetic, optical, or flash storage and may be integrated in whole or in part with the processing unit 40.

As shown, the data storage 42 may then hold program instructions (such as machine language instructions) 46 executable by the processing unit 40 to carry out various functions described herein. For instance, the program instructions may be executable by the processing unit to select the particular spreading code based at least in part on evaluation of forward-link signal quality of one or more other mobile stations in the coverage area. Further, the program instructions may be executable by the processing unit to then cause the assignment message to direct the particular mobile station to use the selected particular spreading code for air interface communication in the coverage area, such as by generating and providing for transmission by the antenna structure 38 an ECAM message specifying the selected spreading code.

An exemplary embodiment of the present method has been described above. Those of ordinary skill in the art will appreciate, however, that changes from the embodiment are possible, while remaining within the scope of the claims.

We claim:

1. A method comprising:
a radio access network (RAN) receiving from a particular mobile station in a cellular coverage area of the RAN a request for the RAN to assign to the particular mobile station an air interface traffic channel in the cellular coverage area;
of a plurality of mobile stations each currently having an assigned air interface traffic channel in the cellular coverage area, the RAN selecting a mobile station based at least in part on a determination that the RAN is transmitting to the mobile station at a minimum forward-link transmission power level, and the RAN determining a spreading code of the air interface traffic channel assigned to the selected mobile station;
the RAN selecting a particular spreading code based at least in part on the determined spreading code of the air interface traffic channel assigned to the selected mobile station; and
responsive to the request, the RAN assigning to the particular mobile station an air interface traffic channel that uses the selected spreading code.

2. The method of claim 1, further comprising:
responsive to the request, determining for the coverage area that there is no available spreading code that is fully orthogonal to each other spreading code currently assigned in the coverage area, and
wherein selecting the particular spreading code based at least in part on the determined spreading code of the air interface traffic channel assigned to the selected mobile station is in response to the determining for the coverage area that there is no available spreading code that is fully orthogonal to each other spreading code currently assigned in the coverage area.

3. The method of claim 1, wherein selecting the particular spreading code based at least in part on the determined spreading code comprises:
identifying, based at least in part on the determined spreading code, a group of spreading codes that are each quasi-orthogonal to the determined spreading code; and
selecting the particular spreading code from the identified group.

4. The method of claim 3, wherein the determined spreading code is a quasi-orthogonal function (QOF) derived using a first QOF mask, and wherein the spreading codes of the group are spreading codes derived using a second QOF mask different than the first QOF mask.

5. The method of claim 3, wherein the selecting of the particular spreading code is further based at least in part on radio configuration.

6. The method of claim 5, wherein selecting the particular spreading code based at least in part on radio configuration comprises, faced with a choice between a radio-configuration-3 code and a radio-configuration-4 code, selecting the radio-configuration-3 code.

7. The method of claim 1, further comprising:
the RAN receiving forward-link signal strength measurements from each mobile station of the plurality,
wherein selecting the mobile station is further based on the mobile station having a highest reported pilot strength for the coverage area.

8. The method of claim 7, wherein each forward-link signal strength measurement specifies a pilot strength measure selected from the group consisting of (i) a ratio of energy per chip to co-channel interference, Ec/Io, and (ii) carrier signal to interference, C/I.

9. The method of claim 1,
wherein the RAN transmits to each mobile station of the plurality at a respective forward-link transmission power that the RAN adjusts based on power control commands received from the mobile station.

10. The method of claim 1, carried out by a RAN entity selected from the group consisting of a base transceiver station (BTS) and a base station controller (BSC).

11. A radio access network (RAN) comprising: an antenna structure arranged to define an air interface coverage area, to receive from a particular mobile station in the air-interface coverage area a spreading code assignment request, and to transmit to the particular mobile station an assignment message assigning the particular mobile station to use a particular spreading code for air interface communication in the coverage area; and
a controller arranged to select, based at least in part on evaluation of forward-link signal quality of one or more other mobile stations currently having an assigned traffic channel in the coverage area, the particular spreading code for the particular mobile station to use for air interface communication in the coverage area and to cause the assignment message to direct the particular mobile station to use the selected particular spreading code for air interface communication in the coverage area,
wherein the controller is arranged to select the particular spreading code by carrying out functions comprising (i) of the one or more other mobile stations, selecting a mobile based at least in part on a determination that the RAN is transmitting to the mobile station at a minimum forward-link transmission power level, (ii) determining a spreading code currently assigned to the selected mobile station, and (iii) selecting the particular spreading code based at least in part on the spreading code currently assigned to the selected mobile station.

12. The RAN of claim 11, wherein the functions further comprise determining that the mobile station has a highest forward-link signal quality,
wherein selecting the mobile station is further based on the determining that the mobile station has the highest forward-link signal quality.

13. The RAN of claim 12, wherein determining that the mobile station has the highest forward-link signal quality is based on a report from mobile station selected from the group consisting of (a) a report of a ratio of energy per chip to co-channel interference, Ec/Io, and (ii) a report of cartier signal to interference, C/I.

14. The RAN of claim 12, wherein the controller is arranged to select the particular spreading code by carrying out functions comprising:
identifying, based at least in part on the spreading code currently assigned to the selected mobile station, a group of spreading codes that are each quasi-orthogonal to the spreading code currently assigned to the selected mobile station; and
selecting the particular spreading code from the identified group.

15. The RAN of claim 14, wherein the spreading code currently assigned to the selected mobile station is a quasi-orthogonal function (QOF) derived using a first QOF mask, and wherein the spreading codes of the group are spreading codes derived using a second QOF mask different than the first QOF mask.

16. The RAN of claim 14, wherein the functions further comprise limiting the group based at least in part on spreading code radio configuration.

17. The RAN of claim 11,
wherein the controller is arranged to make a determination for the coverage area, in response to the request, that there is no available spreading code that is fully orthogonal to each other spreading code currently assigned in the coverage area, and
wherein the controller selecting the particular spreading code based at least in part on evaluation of forward-link signal quality of one or more other mobile stations in the coverage area is in response to the determination.

18. A non-transitory computer readable medium having stored there on instructions executable by a processing unit to carry out functions comprising:
receiving from a particular mobile station in a cellular coverage area of a radio access network (RAN) a request to assign to the particular mobile station an air interface traffic channel in the cellular coverage area;
determining which one of a plurality of mobile stations each currently having an assigned air interface traffic channel in the cellular coverage area has a highest forward-link signal quality, wherein determining the mobile station that has the highest forward-link signal quality comprises determining the mobile station based at least in part on a determination that the RAN is transmitting to the mobile station at a minimum forward-link transmission power;
determining a spreading code of the air interface traffic channel assigned to the determined mobile station;
selecting a particular spreading code based at least in part on the determined spreading code of the air interface traffic channel assigned to the mobile station determined to have the highest forward-link signal quality; and
responsive to the request, assigning to the particular mobile station an air interface traffic channel that uses the selected spreading code, to cause the particular mobile station to engage in air interface traffic channel communication using the selected spreading code.

* * * * *